(12) United States Patent
Lanze et al.

(10) Patent No.: US 12,377,823 B2
(45) Date of Patent: Aug. 5, 2025

(54) BRAKE PEDAL MODULE

(71) Applicants: ZF Active Safety GmbH, Koblenz (DE); ZF Friedrichshafen AG, Friedrichshafen (DE); ZF Steering Systems Poland Sp. Z.o.o., Czechowice-Dziedzice (PL)

(72) Inventors: Eugen Lanze, Urbar (DE); Marcus Janson, Koblenz (DE); Karlheinz Schaust, Fachbach (DE); Georg Adams, Koblenz (DE); Johann Welsch, Weißenthurm (DE); Zul Jalal Arif Ramli, Koblenz (DE); Thomas Kramer, Oldenburg (DE); Markus Wenzel, Bersenbrück (DE); Marek Kozub, Bielsko-Biała (PL); Tomasz Rusin, Wilkowice (PL)

(73) Assignees: ZF Active Safety GmbH, Koblenz (DE); ZF Friedrichshafen AG, Friedrichshafen (DE); ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 0 days.

(21) Appl. No.: 18/586,804

(22) Filed: Feb. 26, 2024

(65) Prior Publication Data
US 2024/0286588 A1   Aug. 29, 2024

(30) Foreign Application Priority Data

Feb. 24, 2023 (DE) .......................... 102023201715.6

(51) Int. Cl.
*B60T 7/04*   (2006.01)
*B60T 7/06*   (2006.01)
*G05G 5/03*   (2008.04)
*G05G 5/05*   (2006.01)

(52) U.S. Cl.
CPC ................ *B60T 7/042* (2013.01); *B60T 7/06* (2013.01); *G05G 5/03* (2013.01); *G05G 5/05* (2013.01); *B60T 2220/04* (2013.01); *G05G 2505/00* (2013.01)

(58) Field of Classification Search
None
See application file for complete search history.

(56) References Cited

U.S. PATENT DOCUMENTS

2017/0351291 A1 * 12/2017 Schoenfuss ............. B60T 7/042

FOREIGN PATENT DOCUMENTS

WO   WO-2022239504 A1 * 11/2022 ................ B60T 7/06

* cited by examiner

*Primary Examiner* — Vicky A Johnson
(74) *Attorney, Agent, or Firm* — Kristin L. Murphy

(57) ABSTRACT

A brake pedal module for a brake-by-wire braking system of a vehicle is disclosed, with a carrier component for attaching the brake pedal module to the vehicle, a brake pedal mounted pivotably on the carrier component, a feedback unit which, to generate a resistance on actuation of the brake pedal, is mechanically coupled at one end to the brake pedal and at the other end to the carrier module, and a sensor unit for detecting a braking request of a driver and having at least one sensor for detecting an actuation travel. The sensor unit is attached to the carrier component at the side of the brake pedal such that the sensor is arranged on a pivot bearing of the brake pedal.

17 Claims, 3 Drawing Sheets

BRAKE PEDAL MODULE

CROSS-REFERENCE TO RELATED APPLICATION

This application claims priority to German Priority application Ser. No. 102023201715.6, filed Feb. 24, 2022, the disclosure of which is incorporated herein by reference in its entirety.

TECHNICAL FIELD

The disclosure concerns a brake pedal module for a brake-by-wire braking system of a vehicle.

BACKGROUND

In brake-by-wire braking systems, a driver's braking request is detected electronically and the brakes of the vehicle are actuated by means of one or more purely electric actuators. For this, it may be provided that an electromotor actuator is assigned to the brake of each individual wheel, as known for example in an "EMB" (electromotor brake). It may however also be provided that an electrohydraulic actuator is controlled centrally in order to actuate the brakes hydraulically in the conventional manner, as known for example in an "IBS" (integrated brake system). Furthermore, a brake-by-wire braking system may be configured as a mixed system in which the brakes of one vehicle axle, e.g. that of the front wheels, are assigned to an IBS and the brakes of another vehicle axle, for example the that of the rear wheels, are each configured as an EMB.

Since, in brake-by-wire braking systems, there is usually no mechanical connection between a brake pedal and the brakes, a feedback behavior of the brake pedal for the driver is simulated, for example by a counterforce unit. More precisely, the resistance increases with the increasing travel on actuation of the brake pedal.

Usually, such systems are integrated in a dead space below the brake pedal. Since this space is however very limited, it is challenging to accommodate all necessary components therein, for example, a feedback unit for generating a resistance on actuation of the brake pedal and a sensor for detecting a driver's brake request. Also, mounting is difficult because of the limited installation space.

SUMMARY

What is needed is a brake pedal module which can be integrated particularly well in a vehicle environment and is also easy to install.

A brake pedal module for a brake-by-wire braking system of a vehicle is disclosed, with a carrier component for attaching the brake pedal module to the vehicle, a brake pedal mounted pivotably on the carrier component, a feedback unit which, to generate a resistance on actuation of the brake pedal, is mechanically coupled at one end to the brake pedal and at the other end to the carrier module, and a sensor unit for detecting a braking request of a driver and having at least one sensor for detecting an actuation travel. The sensor unit is attached to the carrier component at the side of the brake pedal such that the sensor is arranged on a pivot bearing of the brake pedal.

Since the sensor unit is attached to the carrier component at the side of the brake pedal, the brake pedal module is optimized with respect to the available installation space. For example, the sensor unit is arranged outside the dead space below the brake pedal. This also considerably simplifies the routing of the electrical lines for contacting the sensor unit. For example, when routing the line, there is no need to take account of the movement path of the feedback unit.

In one exemplary arrangement, the sensor is a rotation angle sensor. A rotation angle sensor is suitable for arranging on the side of the brake pedal. Due to a rotation angle sensor, an actuation travel of the brake pedal can be detected.

In one exemplary arrangement, the sensor unit is a pre-mounted unit. For example, the sensor unit has a housing in which the sensor electronics are accommodated, and electrical connections are present on the housing for electrical contacting of the sensor unit. This means that the sensor unit can be pre-produced as a sub-assembly, whereby mounting of the sensor unit on the brake module is particularly easy. In other words, the sensor unit is an autonomous unit.

Accordingly, the brake pedal module has a modular structure. This is advantageous in that the sensor unit can be designed to be replaceable. In this way, customer-specific variants, which differ for example only in the sensor unit, can be produced particularly easily.

According to an exemplary arrangement, the carrier component comprises two shell-like components which are attached to one another and delimit an accommodation space for accommodating the feedback unit. Thus the feedback unit is protected from mechanical damage before the brake pedal module is mounted in the vehicle. Also, soiling of the feedback unit is avoided.

In one exemplary arrangement, the sensor unit is arranged outside the accommodation space. The sensor unit is thus easily accessible on the brake pedal module, so that the electrical lines for contacting the sensor unit can be connected particularly easily. Furthermore, mounting of the sensor unit is simplified.

For example, the sensor unit is screwed to the carrier component, which is also particularly easy because of the arrangement of the sensor unit outside the accommodation space.

The brake pedal may be pivotably received between the shell-like components. This achieves a compact structure of the brake pedal module. Also, a pivotable mounting of the brake pedal can be achieved easily.

For example, bearing elements such as for example a joint pin, or receivers for a joint pin present on the brake pedal, may be already molded on the shell-like components so that the brake pedal is automatically pivotably mounted when the brake pedal module is assembled.

A joint pin may be molded on the brake pedal and protrude through the carrier component in the pivot bearing, wherein a measuring element, which is used by the sensor unit for detecting the position of the brake pedal, is arranged, for example, molded, on the end face of the joint pin. The measuring element thus forms an interface between the sensor unit and the brake pedal. Because the joint pin with the measuring element protrudes through the carrier component, the measuring element is easily accessible from outside the accommodation space, so that the sensor unit can detect the position of the measuring element when arranged at the side of the brake pedal.

According to one exemplary arrangement, the feedback unit has a first counterforce unit loading the brake pedal into a rest position, and at least one further counterforce unit acting parallel to the first counterforce unit and/or a damping unit acting parallel to the first counterforce unit. Because the first counterforce unit and the further counterforce unit and/or the damping unit are connected in parallel with one another, the feedback unit may have a short length without deterioration in the feedback behavior of the brake pedal. Thus the feedback unit can also be accommodated in restricted installation spaces.

The damping unit and the further counterforce unit may be present as a combined unit.

The brake pedal is, for example, configured as a standing brake pedal. In this case, the advantages of the sensor unit arranged at the side and the shortened feedback unit are particularly beneficial since, with a standing brake pedal, usually only a relatively limited installation space is available for accommodating components in the dead space below the brake pedal.

In one exemplary arrangement, the brake pedal module is a premounted force-enclosed structural unit which can be attached to the vehicle via the carrier module. Thus all components of the brake pedal module may be mounted on the carrier component. Thus, apart from fixing of the structural unit to the vehicle, no additional mechanical support for any of these components is required on the vehicle. For example, only the carrier component need be attached to the vehicle. So mounting of the brake pedal module in the vehicle is particularly easy.

The brake pedal module according to the disclosure is suitable for use in a brake-by-wire braking system which is equipped with EMB brakes and/or configured as an IBS system.

BRIEF DESCRIPTION OF DRAWINGS

Further advantages and features of the disclosure arise from the following description and the appended drawings, to which reference is made. In the drawings.

DETAILED DESCRIPTION

Figure 1:
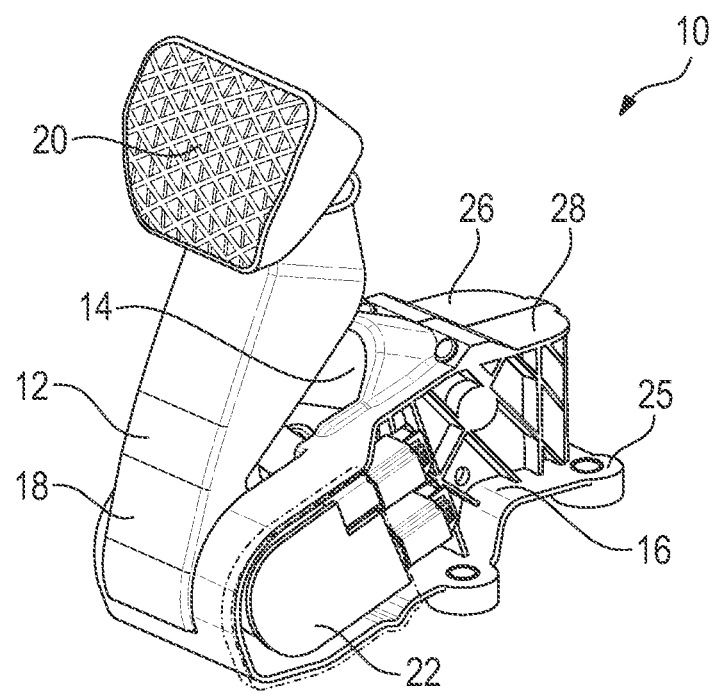
FIG. 1 shows a brake pedal module according to the disclosure.

FIG. 1 shows schematically a brake pedal module 10 for a "brake-by-wire" braking system of a vehicle.

The brake pedal module 10 serves for electronically detecting a braking request from the driver.

The brake pedal module 10 comprises a brake pedal 12 which can be pivotably mounted on the vehicle.

The brake pedal 12 may be moved, for example, pivoted, between a rest position and an end position. To this end, a driver can actuate the brake pedal 12 with his foot. FIG. 1 shows the brake pedal 12 in its rest position.

In this exemplary arrangement, the brake pedal 12 is a standing brake pedal.

The brake pedal module furthermore comprises a feedback unit 14 which generates a resistance on actuation of the brake pedal 12.

The feedback unit 14 is merely indicated in FIG. 1 and is described in detail below in connection with FIGS. 4 and 5.

Also, the brake pedal module 10 has a carrier component 16 for mounting the brake pedal module 10 on the vehicle.

The brake pedal 12 is pivotably mounted on the carrier component 16.

The brake pedal 12 is formed by a strut 18.

At a free end, the strut 18 has an actuating face 20 which a driver can press with his foot in order to signal a braking request.

The brake pedal module 10 also comprises a sensor unit 22 for detecting a driver's braking request, with at least one sensor for detecting an actuation travel.

In this exemplary arrangement, the sensor unit 22 comprises an angle sensor.

The sensor unit 22 is attached to the carrier component 16 at the side of the brake pedal 12, such that the sensor is arranged on a pivot bearing 24 (see FIG. 2) of the brake pedal 12.

Thus all components of the brake pedal module 10 are mounted on the carrier component 16, so that the brake pedal module 10 is a premounted force-enclosed unit which can be attached to the vehicle via the carrier component 16.

Thus only the carrier component 16 need be attached to the vehicle.

To this end, in the exemplary arrangement, screw tabs 25 are provided on the carrier component 16.

The carrier component 16 comprises two shell-like components 26, 28 which are attached to one another.

The shell-like components 26, 28 are for example, plastic injection moldings.

The shell-like components 26, 28 delimit an accommodation space 30 (see FIG. 4) for accommodating the feedback unit 14.

The brake pedal 12 is pivotably received between the shell-like components 26, 28.

The shell-like components 26, 28 are for example joined together by screwing, glueing, latching or ultrasound welding.

The sensor unit 22 is arranged outside the accommodation space 30.

For example, the sensor unit 22 is screwed to the carrier component 16.

Figure 2:
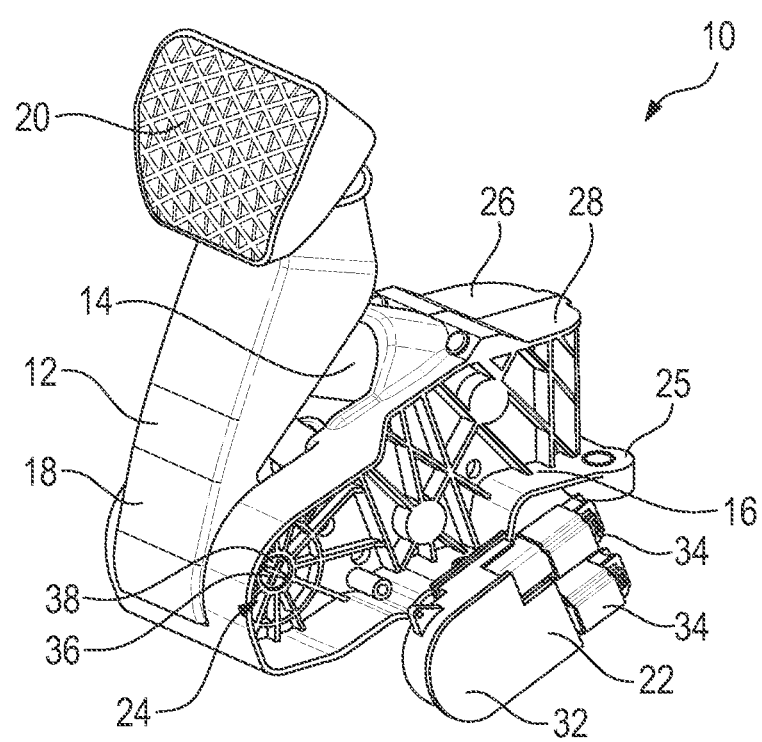
FIG. 2 shows the brake pedal module from FIG. 1.

In FIG. 2, the sensor unit 22 is shown in a state detached from the brake pedal module 10.

From this, it is clear that the sensor unit 22 is a premounted unit.

The sensor unit 22 has a housing 32 which contains a sensor electronics.

Electrical connections 34 for electrical contacting of the sensor units 22 are present on the housing 32.

Figure 3:
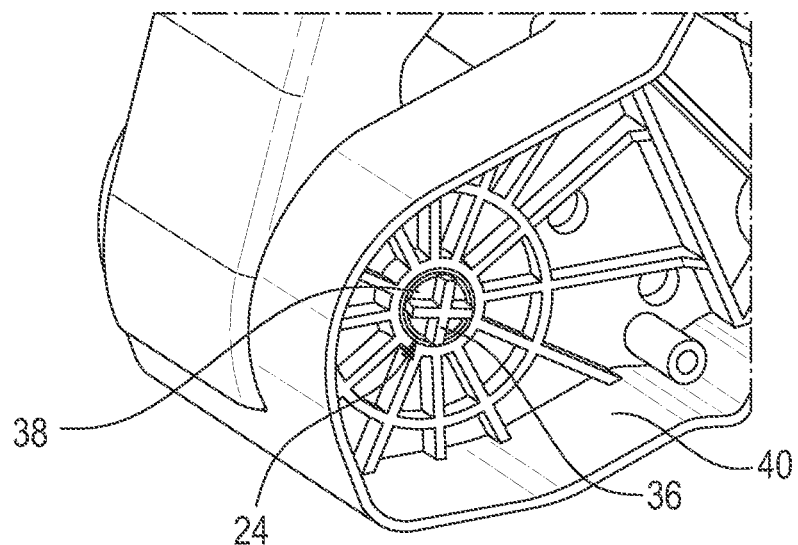
FIG. 3 shows a detail view of the brake pedal module at an interface between a brake pedal and a sensor unit.

FIG. 3 shows a detail view of the brake pedal module 10 at the side of the brake pedal 12, at an interface between the brake pedal 12 and the sensor unit 22.

A measuring element 36 is arranged at the interface and is used by the sensor unit 22 to detect the position of the brake pedal 12. In concrete terms, the sensor unit 22 may establish an angular position of the brake pedal 12 by a rotational position of the measuring element 36.

To this end, the measuring element 36 has for example an arrangement which allow detection of a rotational movement of the brake pedal 12 or measuring element 36. In the exemplary arrangement, the measuring element 36 is cruciform.

The measuring element 36 is arranged on an end face of a joint pin 38 of the brake pedal 12 which protrudes through the carrier component 16 in the pivot bearing 24.

In one exemplary arrangement, the measuring element 36 is molded onto the joint pin 38, so no separate mounting of the measuring element 36 is required.

The measuring element 36 thus rotates with the brake pedal 12.

A wall 40 is formed on the carrier component 16 in a region running around the pivot bearing 24, and forms a receiver for the sensor unit 22.

The wall 40 surrounds the sensor unit 22 when the latter is attached to the carrier component 16. Thus the wall 40 protects the sensor unit 22 from mechanical damage and also serves as a positioning aid when mounting the sensor unit 22 on the carrier component 16.

Figure 4:
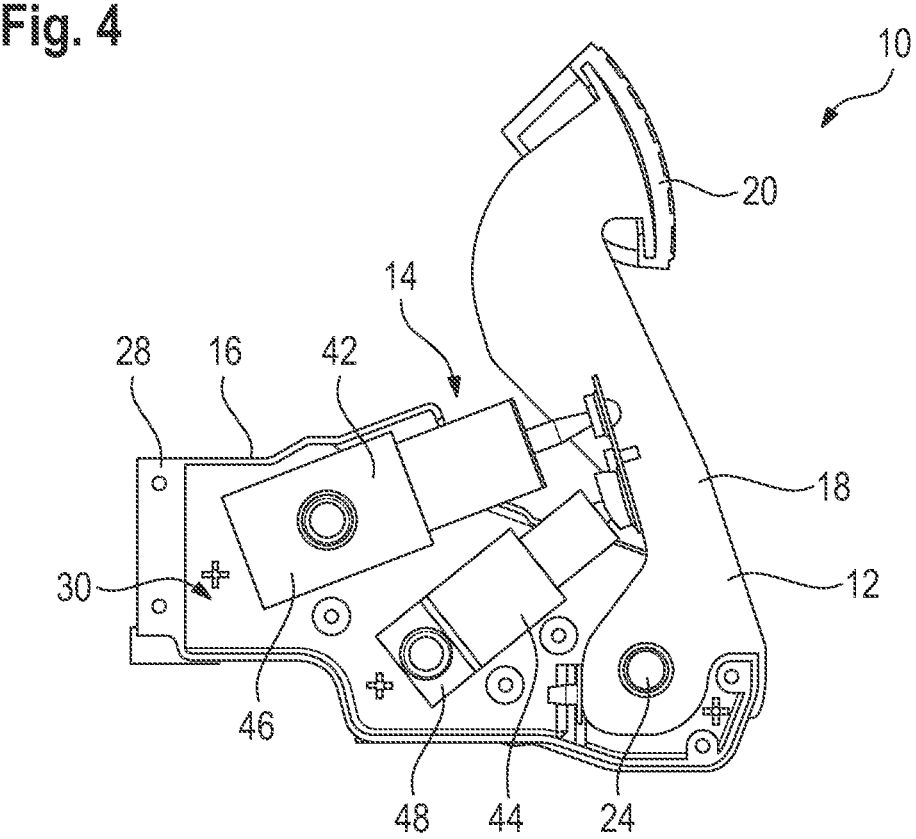
FIG. 4 shows a side view of the brake pedal module in unactuated state of the brake pedal.

FIG. 4 shows the brake pedal module 10 in a side view, wherein one of the shell-like components 26, 28 has been omitted to allow a view of the accommodation space 30.

For example, the feedback unit 14 arranged in the accommodation space 30 can be seen.

The feedback unit 14 is arranged between the brake pedal 12 and the carrier component 16. In fact, the feedback unit 14 is mechanically coupled at one end to the brake pedal 12 and at the other end to the carrier component 16.

The feedback unit 14 has a first counterforce unit 42 which loads the brake pedal 12 into the rest position.

Furthermore, the feedback unit 14 has an active unit 44 which is connected in parallel to the first counterforce unit 42, and for example is a combined counterforce and damping unit. The further unit 44 may however also be configured exclusively for damping or as a counterforce unit without damping effect.

The first counterforce unit 42 and the counterforce and damping unit 44 are structural units arranged separately from one another in this exemplary arrangement, each of which is accommodated in its own housing 46, 48.

The first counterforce unit 42 on one side and the combined counterforce and damping unit 44 on the other are each coupled at one end to the brake pedal 12 and at the other end mounted, for example pivotably, on the vehicle. In concrete terms, the two housings 46, 48 are each pivotably mounted on the carrier component 16 at one end.

The counterforce unit 42 generates a resistance on actuation of the brake pedal 12. Also, after actuation of the brake pedal 12, the counterforce unit 42 causes a return of the brake pedal 12 to its rest position shown in FIG. 4.

On actuation of the brake pedal 12, the combined counterforce and damping unit 44, in addition to a resistance, also causes a speed-dependent damping and a hysteresis, thus creating a familiar pedal feel for the driver.

Figure 5:
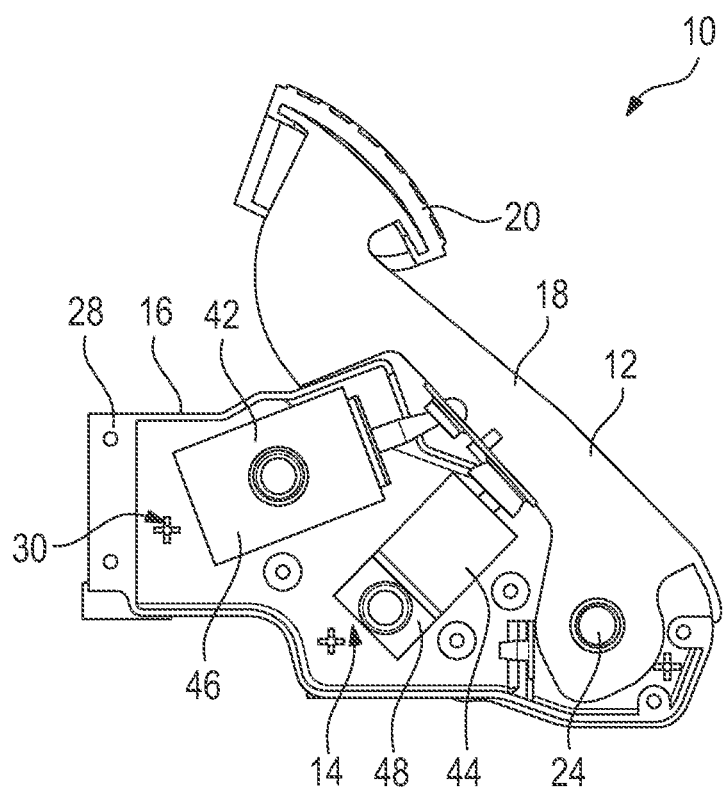
FIG. 5 shows a side view of the brake pedal module in which the brake pedal is in an end position.

FIG. 5 shows the brake pedal module 10 in a side view, wherein the brake pedal 12 is in an end position.

As shown in FIG. 5, a stop for the brake pedal 12 is formed on the carrier component 16 so that the brake pedal 12 cannot be pivoted beyond the end position.

The invention claimed is:

1. A brake pedal module for a brake-by-wire braking system of a vehicle, comprising a carrier component for attaching the brake pedal module to the vehicle, a brake pedal mounted pivotably on the carrier component, a feedback unit which, to generate a resistance on actuation of the brake pedal, is mechanically coupled at one end to the brake pedal and at the other end to the carrier module, and a sensor unit for detecting a braking request of a driver and having at least one sensor for detecting an actuation travel, wherein the sensor unit is attached to the carrier component at the side of the brake pedal such that the sensor is arranged on a pivot bearing of the brake pedal, wherein a joint pin is molded on the brake pedal and protrudes through the carrier component in the pivot bearing, wherein a measuring element, which is used by the sensor unit for detecting the position of the brake pedal, is arranged on the end face of the joint pin.

2. The brake pedal module as claimed in claim 1, wherein the sensor unit is a premounted unit.

3. The brake pedal module as claimed in claim 2, wherein the brake pedal is pivotably received between the shell-like components.

4. The brake pedal module as claimed in claim 2, wherein the carrier component comprises two shell-like components which are attached to one another and delimit an accommodation space for accommodating the feedback unit.

5. The brake pedal module as claimed in claim 4, wherein a joint pin is molded on the brake pedal and protrudes through the carrier component in the pivot bearing, wherein a measuring element, which is used by the sensor unit for detecting the position of the brake pedal, is arranged on the end face of the joint pin.

6. The brake pedal module as claimed in claim 5, wherein the feedback unit has a first counterforce unit loading the brake pedal into a rest position, and at least one further counterforce unit acting parallel to the first counterforce unit and/or a damping unit acting parallel to the first counterforce unit.

7. The brake pedal module as claimed in claim 6, wherein the brake pedal is configured as a standing brake pedal.

8. The brake pedal module as claimed in claim 4, wherein the brake pedal module is a premounted, force-enclosed structural unit which can be attached to the vehicle via the carrier module.

9. The brake pedal module as claimed in claim 1, wherein the carrier component comprises two shell-like components which are attached to one another and delimit an accommodation space for accommodating the feedback unit.

10. The brake pedal module as claimed in claim 9, wherein the brake pedal is pivotably received between the shell-like components.

11. The brake pedal module as claimed in claim 9, wherein the sensor unit is arranged outside the accommodation space.

12. The brake pedal module as claimed in claim 1, wherein the feedback unit has a first counterforce unit loading the brake pedal into a rest position, and at least one further counterforce unit acting parallel to the first counterforce unit and/or a damping unit acting parallel to the first counterforce unit.

13. The brake pedal module as claimed in claim 1, wherein the brake pedal is configured as a standing brake pedal.

14. The brake pedal module as claimed in claim 1, wherein the brake pedal module is a premounted, force-enclosed structural unit which can be attached to the vehicle via the carrier module.

15. A brake pedal module for a brake-by-wire braking system of a vehicle, comprising a carrier component for attaching the brake pedal module to the vehicle, a brake pedal mounted pivotably on the carrier component, a feedback unit which, to generate a resistance on actuation of the brake pedal, is mechanically coupled at one end to the brake pedal and at the other end to the carrier module, and a sensor unit for detecting a braking request of a driver and having at least one sensor for detecting an actuation travel, wherein the sensor unit is attached to the carrier component at the side of the brake pedal such that the sensor is arranged on a pivot bearing of the brake pedal, wherein the feedback unit has a first counterforce unit loading the brake pedal into a rest position, and at least one further counterforce unit acting parallel to the first counterforce unit and/or a damping unit acting parallel to the first counterforce unit.

16. A brake pedal module for a brake-by-wire braking system of a vehicle, comprising a carrier component for attaching the brake pedal module to the vehicle, a brake pedal mounted pivotably on the carrier component, a feedback unit which, to generate a resistance on actuation of the brake pedal, is mechanically coupled at one end to the brake pedal and at the other end to the carrier module, and a sensor unit for detecting a braking request of a driver and having at least one sensor for detecting an actuation travel, wherein the sensor unit is attached to the carrier component at the side of the brake pedal such that the sensor is arranged on a pivot bearing of the brake pedal, wherein the feedback unit has a first counterforce unit loading the brake pedal into a rest position, and at least one further counterforce unit acting parallel to the first counterforce unit and/or a damping unit acting parallel to the first counterforce unit, wherein the sensor unit is a premounted unit, wherein the carrier component comprises two shell-like components which are attached to one another and delimit an accommodation space for accommodating the feedback unit, wherein a joint pin is molded on the brake pedal and protrudes through the carrier component in the pivot bearing, wherein a measuring element, which is used by the sensor unit for detecting the position of the brake pedal, is arranged on the end face of the joint pin.

17. The brake pedal module as claimed in claim 16, wherein the feedback unit has a first counterforce unit loading the brake pedal into a rest position, and at least one further counterforce unit acting parallel to the first counterforce unit and/or a damping unit acting parallel to the first counterforce unit.

* * * * *